United States Patent
Bakhuizen

(10) Patent No.: US 7,848,742 B2
(45) Date of Patent: Dec. 7, 2010

(54) BANDWIDTH SAVING ON CERTAIN INTERFACES IN A TELECOMMUNICATION SYSTEM

(75) Inventor: Martin Bakhuizen, Djursholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 883 days.

(21) Appl. No.: 11/571,182

(22) PCT Filed: Jun. 23, 2005

(86) PCT No.: PCT/IB2005/052067

§ 371 (c)(1),
(2), (4) Date: Dec. 22, 2006

(87) PCT Pub. No.: WO2006/000995

PCT Pub. Date: Jan. 5, 2006

(65) Prior Publication Data

US 2007/0211753 A1   Sep. 13, 2007

(30) Foreign Application Priority Data

Jun. 24, 2004   (SE) .................................. 0401669

(51) Int. Cl.
*H04W 24/00* (2009.01)

(52) U.S. Cl. .................... 455/423; 455/422.1; 455/450; 455/452.1; 455/452.2

(58) Field of Classification Search ...................... None
See application file for complete search history.

(56) References Cited

U.S. PATENT DOCUMENTS

| | | | |
|---|---|---|---|
| 6,400,954 B1 | 6/2002 | Khan et al. | |
| 6,490,271 B1 * | 12/2002 | Erjanne | 370/347 |
| 2002/0003783 A1 * | 1/2002 | Niemela et al. | 370/329 |
| 2002/0040294 A1 * | 4/2002 | Kekki et al. | 704/200 |
| 2003/0176184 A1 * | 9/2003 | Hakalin | 455/423 |
| 2004/0202180 A1 * | 10/2004 | Montes Linares | 370/395.2 |
| 2005/0159165 A1 * | 7/2005 | Argyropoulos et al. | 455/452.2 |

FOREIGN PATENT DOCUMENTS

WO   WO 0128268 A1   4/2001

* cited by examiner

*Primary Examiner*—Rafael Pérez-Gutiérrez
*Assistant Examiner*—Daniel Nobile
(74) *Attorney, Agent, or Firm*—Roger S. Burleigh

(57) ABSTRACT

Saving bandwidth on the Abis interface in mobile communication systems. When congestion appears on an Abis full rate channel communication is switched over to half rate while keeping full rate on the radio interface. Thereby possibilities are still available for good error correction and control on a highly interfered radio channel.

10 Claims, 2 Drawing Sheets

BANDWIDTH SAVING ON CERTAIN INTERFACES IN A TELECOMMUNICATION SYSTEM

FIELD OF THE INVENTION

The present invention relates to saving of bandwidth on certain interfaces in mobile telecommunication systems. It particularly relates to saving bandwidth on the Abis interface according to GSM standards or corresponding interfaces in other standards.

BACKGROUND

In a mobile telecommunication system, a number of interfaces are defined interconnecting the nodes of the system. Over the interfaces data is transported such as coded speech information. The codes chosen determines the data quality. A low bit rate code gives lower quality and vice versa. Over some interfaces a low bit rate could be acceptable, while this does not apply for others depending on the interference the interface is subjected to.

The GSM standards have defined how the speech for each Adaptive Multi Rate, AMR, codec is to be transported over the Abis interface connecting the base station controller BSC with the radio base station, RBS, or base transceiver station, BTS. AMR has two codec modes: FullRate, FR, and Halfrate, HR. Eight AMR speech codecs are defined, of which all eight can be used on the full rate mode but only the six lowest on the half rate mode. One Remote Transcoder protocol is defined for full rate mode and one for half rate. For full rate a 16 kbit/s Abis path is used while for half rate a 8 kbit/s path is used.

Although Abis bandwidth can be saved by using the half rate mode, the speech quality is significantly reduced on the radio interface when doing so, especially in high radio interference scenarios. High radio interference is typical in the state of the art networks using Fraction Load Planning, FLP with one to one reuse 1/1. The use of 1/1 is becoming more and more common as traffic is increasing.

The eight AMR codecs used for coding the information sent over the Abis interface have the following bit rates, kilobits per second (kb/s):

| Full rate, kb/s | Half rate, kb/s |
| --- | --- |
| 4.75 | 4.75 |
| 5.15 | 5.15 |
| 5.9 | 5.9 |
| 6.7 | 6.7 |
| 7.4 | 7.4 |
| 7.95 | 7.95 |
| 10.2 | |
| 12.2 | |

High radio interference AMR FR will adapt to the current situation and select a lower AMR codec. When using a AMR codec of 7.4 or lower in full rate mode, the Abis will stay on using the 16 kbit/s Remote Transcoder protocol, although in principle 8 kbit/s Abis would be enough. This is done so that Abis Remote Transcoder protocol can be kept when the radio environment is improved and a AMR codec of 7.95 and higher is selected.

With the introduction of the EDGE standard the need for more Abis bandwidth per radio timeslot increases. EDGE normally requires 64 kbit/s per radio timeslot. The introduction of EDGE will for many RBS sites require all additional E1/T1 leased line. This is costly for the operator. Operators are now more and more asking for solutions that will enable them to avoid adding more leased lines.

In U.S. Pat. No. 6,400,954 B1 a technique is used to adjust the transmission on the air interface depending on the load of the access network e.g. the Abis interface.

SUMMARY OF THE INVENTION

The idea of this invention is to, temporarily or permanently, use a low code rate for an otherwise overloaded interface while compensating for this on a following interface not being that overloaded but interfered. This could be done by using the fact that highly interfered interfaces could still use a low code rate if available error correction and control methods are used. The overloaded interface could be the Abis interface of the GSM system connecting the base station controller with the base station and the following is the radio interface to the mobile station, alternatively the corresponding units and interfaces of other communications standards.

In a preferred embodiment of the invention full rate codecs up to 7.4 is transported over 8 kbit/s Abis, which then saves 50% transmission for that call, as otherwise a full rate call would have used 16 kbit/s Abis. This can be done either for all calls or dynamically for ongoing calls triggered by congestion on Abis.

The invention is equally applicable to downlink and uplink communications or both. The invention is more fully defined in the appended claims.

THE DRAWINGS

The features and advantages of the invention will become more apparent taken in conjunction with the following drawings and the following detailed description exemplifying the invention.

DETAILED DESCRIPTION

Figure 1:
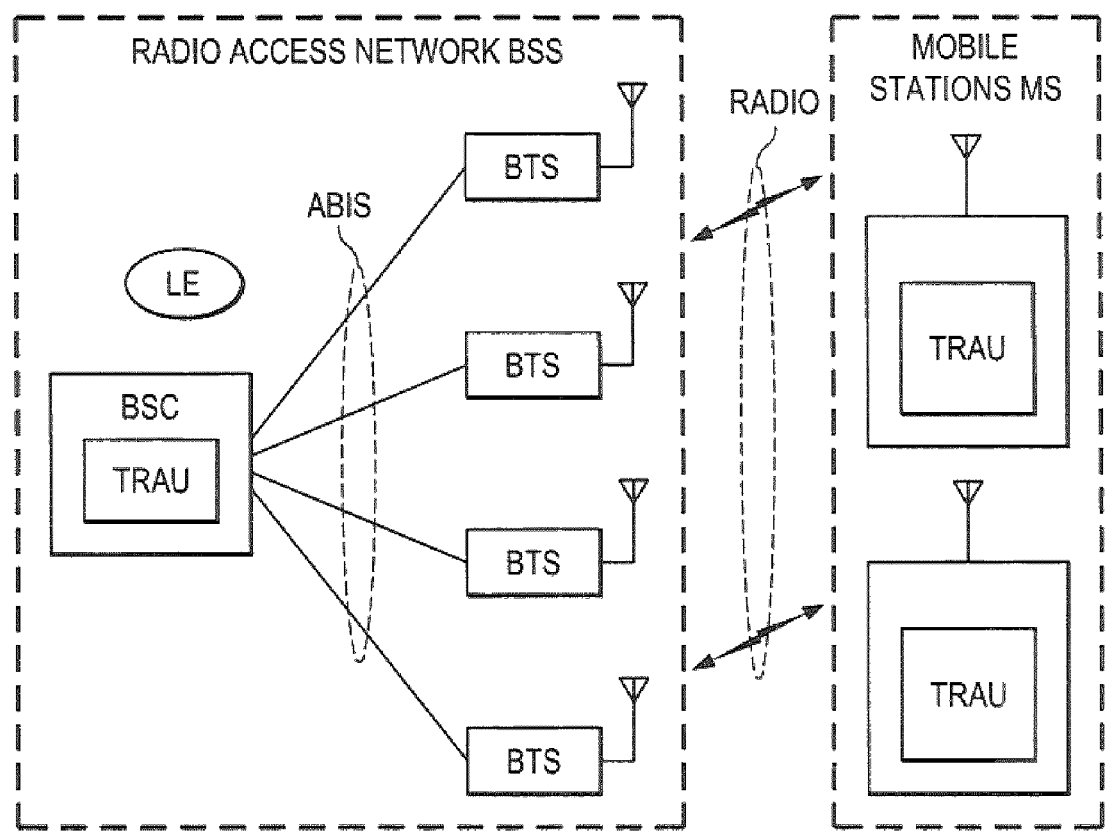
FIG. 1 is an overview of an essential part of a GSM system for the understanding of the invention.

In FIG. 1 a radio access network is shown including a Base Station System, BSS. The BSS comprises a Base Station Controller, BSC, and a number of radio base stations or Base Transceiver Stations, BTS. The respective BTS are connected to BSC over Abis interfaces and to mobile stations MS over the radio interface. BSC includes a transcoder and rate adapter unit, TRAU, coding speech or other data information. A corresponding TRAU is also included in each mobile station. Load estimating means (LE) are also comprised in the network of FIG. 1. The LE signals to various nodes of the system for changing conditions depending on the load or traffic situation.

Figure 2A:
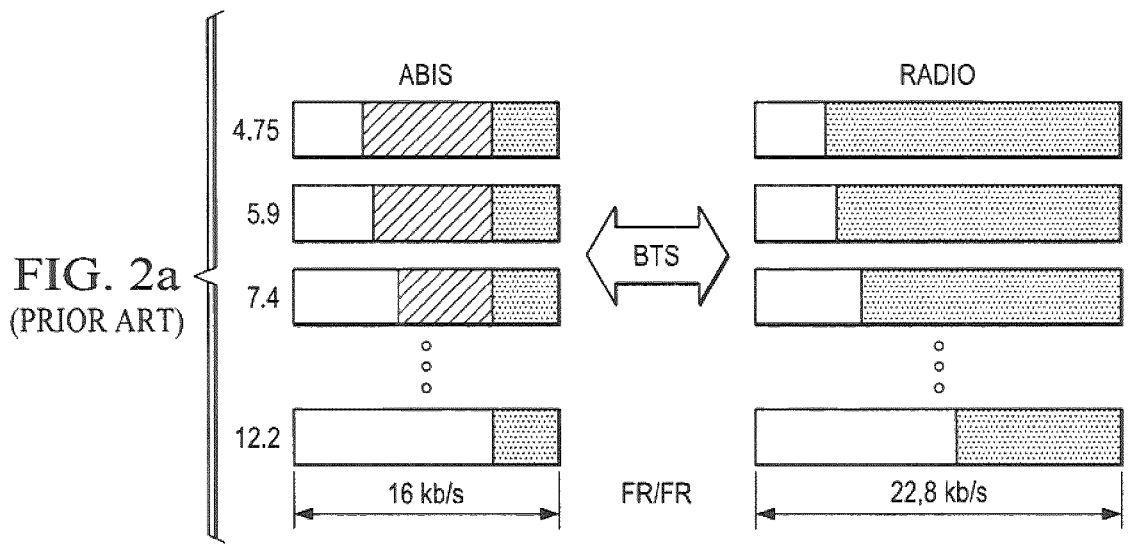
FIG. 2 illustrates how the invention works for full rate and half rate transfer of information.
Figure 2B:
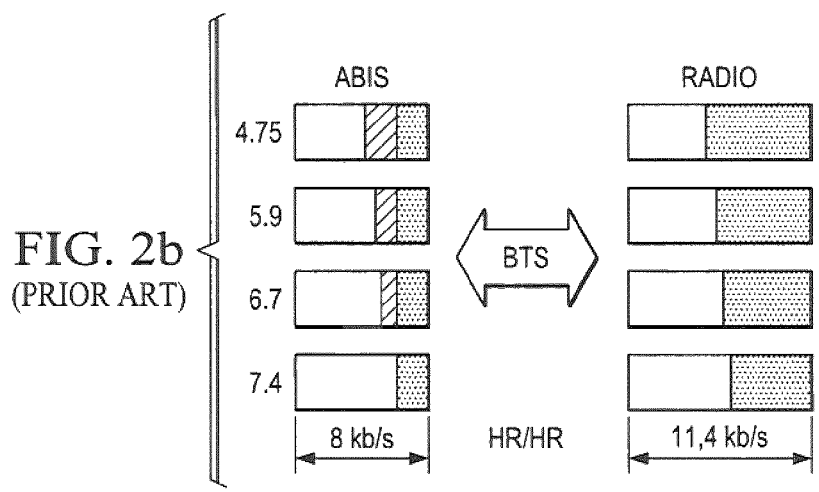

In FIG. 2a today's full rate is illustrated and the four AMR FR codecs 4.75, 5.9, 7.4 and 12.2 kb/s are exemplified. Together with padding and control bits this adds up to a full rate Abis path of 16 kb/s. FIG. 2b shows today's half rate with AMR HR codecs of 4.75, 5.9, 6.7 and 7.4 on a 8 kb/s Abis path.

Speech traffic in the GSM system is a- or µ-(mju-)law coded in the core network and down to the TRAU in the BSC. In the TRAU the speech is transcoded into one of several coding formats used between the TRAU and the mobile station, MS. On the Abis interface, the speech is transported using the Remote Transcoder Protocol for the 8 or 16 kb/s Abis paths, which are a parts of a 64 kbit/s channel on a E1 or T1 interface. On the radio interface two basic formats are also defined as FullRate, FR, and HalfRate, HR. Today there is a one to one mapping between using FR on the radio interface and 16 kbit/s on the Abis interface, and using HR on the radio interface and 8 kbit/s on Abis respectively. When using AMR on a FR channel on the radio interface, the Remote Transcoder Protocol will use a 16 kb/s subchannel on the Abis interface, FIG. 2a. And when using AMR on HR, the Remote Transcoder Protocol will use a 8 kbit/s subchannel as depicted in FIG. 2b.

As mentioned above AMR consists of collection of eight different speech coders using codec rates between 4.75 kbit/s and 12.2 kbit/s. This allows for different amount of error control and correction coding on the radio interface, which totally may carry 22.8 kb/s for full rate and 11.4 kb/s on half rate communications. For AMR FR all codec rates can be used. For highly interfered radio environments a low rate codec, e.g. 4.75, will be used allowing for very good error correction. For less interfered radio environments a high rate codec, e.g. 12.2 or 10.2, will be used. This leads to good quality and high capacity.

For AMR HR only six of the AMR codecs can be used, and the amount of error control and correction coding is significantly reduced, since half rate on the radio interface is only 11.4 kb/s. This results in lower quality (and capacity) in interfered radio environments compared with AMR FR. For an active call a set of up to 4 AMR codec rates is selected. The codec rate used varies during the call, following the variations in radio environment quality.

Figure 2C:
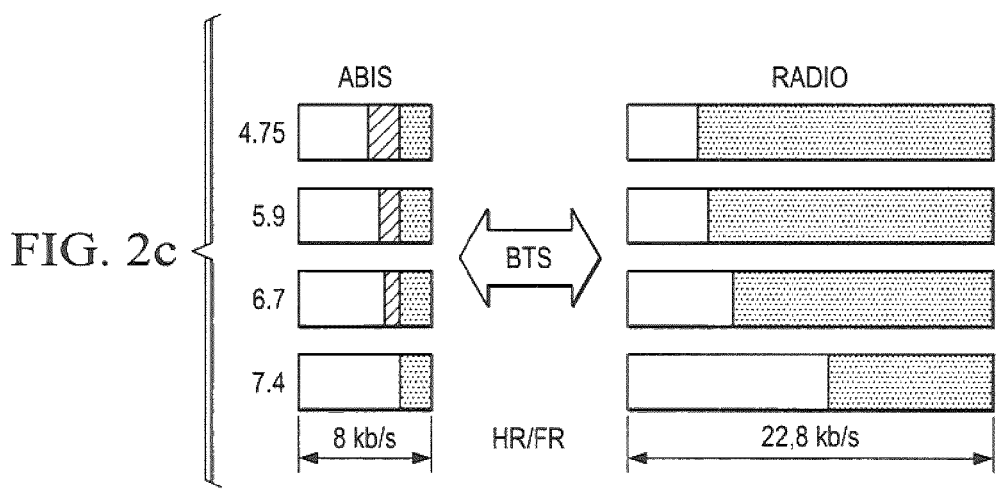

The use of half rate on the Abis and full rate on the radio channel according to the preferred embodiment of the invention is shown in FIG. 2c. Instead of using the 16 kb/s Remote Transcoder protocol for AMR FR, an 8 kb/s Remote TRAU protocol is used. Depending on the solution for switching between the 16 and 8 kb/s TRAU protocol, the 8 kb/s protocol may be identical to the existing AMR HR protocol. As a consequence AMR FR is limited to codecs 7.4 and lower for the calls using the 8 kb/s protocol (The 7.95 codec rate could be transported over a half rate radio interface, but is normally avoided)

When applying the invention in the uplink version the corresponding codecs are used in the TRAU of the mobile station in order to be able to assign an 8 kb/s path on Abis even for FR uplink in accordance with the invention.

The speech quality difference between AMR 10.2 and AMR 7.4 is noticeable especially in some background noise scenarios, but not large. In addition a significant part of the calls will already be link adapted down from 10.2/12.2 to a codec of 7.4 or lower. When the Abis transmission resources are fully allocated and a request for a new circuit switched call or an addition/modification of GPRS/EGPRS packet data channel is received, then enough AMR FR calls are modified using 8 kb/s Abis to make room for the request. Calls with AMR FR on 8 kb/s can be allocated Abis transmission in pairs on the same 16 kb/s. The modification from 16 to 8 kb/s Abis may either be done using the same air timeslot (no handover) and doing a "mode modify", or by doing an intra-cell handover.

The active codec set (ACS) should ideally be changed according to if 8 or 16 kb/s Abis is used. E.g. with 16 kb/s Abis the ACS may be [4.75; 5.9; 10.2]. For 8 kb/s Abis it could be [4.75; 5.9; 7.4]. If the ACS is not changed when going from 16 to 8 kb/s Abis, then the ACS can only partially be used, i.e. an ACS of [4.75; 5.9; 10.2] would in practice become [4.75; 5.9] after the change. An alternative solution to introducing two separate ACS for 8 kb/s Abis would be to instruct the operator to chose the ACS such that it is good also for 8 kb/s Abis, e.g. use ACS [4.75; 5.9; 7.4; 10.2].

The selection of which calls to modify first should ideally be based on the actual codec used for each call. This may not be a feasible solution, so as an alternative other values like RXQUAL may be used as a basis for the priority mechanism.

The bandwidth savings depend on the penetration of AMR capable terminals.

CONCLUSIONS

The existing solution is to trigger tile use of AMR HR in overload situations, although the current overload trigger is on the radio interface and not Abis. The advantage with the proposed solution is that Abis capacity can be saved (and used for e.g. EDGE) with very little sacrifice in speech quality. Downgrading to AMR HR on both Abis and radio interfaces on the other hand means significantly lower speech quality, especially in highly loaded networks with high interference levels on the radio interface. This situation is becoming more common as FLP networks is being more widely used, e.g. widely used by operators in many city centres worldwide.

By limiting the codec set for AMR FR to the five lowest it is proposed to use AMR FR together with the Remote Transcoder Protocol using a 8 kbit/s subchannel on the Abis interface. It combines the advantages or the FR radio channel with maximum error control and correction and the lower bandwidth of 8 kbit/s on the Abis interface. In this way 50% transmission is saved, to the cost of not being able to use the highest rate AMR codecs, resulting in a slightly reduced speech quality in not or low interfered radio environments. The existing option of using AMR HR (with 8kbit/s Abis) results in lower speech quality and capacity in interference limited radio networks compared with using the invention.

A control algorithm can be implemented selecting when to use the AMR FR—8 kbit/s Abis combination. This algorithm can take Abis load into consideration and also individual call quality aspects.

The invention claimed is:

1. A method for communication of information in a telecommunication system having at least one fixed Abis interface and one radio interface, wherein each interface has flexible capacities for a plurality of connections having eligible higher or lower bandwidths, wherein the information sent on the connections are coded at eligible code rates, wherein the fixed Abis interface connects a base station controller with a base transceiver station, wherein the information is coded according to Adaptive Multi Rate (AMR) codecs defining half rate or full rate communications between the base station controller and the base transceiver station, and wherein the base transceiver station has half rate or full rate communications for the information on the radio interface with a mobile station, said method comprising the steps of:

estimating the current load on the fixed Abis interface; and, if the estimated current load is above a certain threshold, switching communications on the Abis interface from the full rate to the half rate while keeping the full rate communications on the radio interface, wherein when the estimated current load is above the certain threshold this indicates that the Abis interface is currently overloaded and then the subsequent switching communications on the Abis interface from the full rate to the half rate results in the Abis interface being even more overloaded than before the switching of the communications but the overload is compensated for on the radio interface.

2. The method of claim 1, further comprising the step of selecting a lower code rate if the one presently used does not fit into a lower bandwidth associated with the half rate on the fixed Abis interface.

3. The method of claim 1, further comprising the step of adding additional error control and correction bits to the radio interface connection.

4. The method of claim 1, wherein a lower bandwidth and code rate associated with the half rate on the fixed Abis interface are chosen for the uplink or the downlink or both.

5. The method of claim 1, wherein the fixed Abis interface is the Abis interface of the base station system of GSM, said fixed Abis interface connecting the base station controller with the base transceiver station, and wherein the information is coded according to Adaptive Multi Rate (AMR) codecs defining half rate and full rate data transportation between the base station controller and the base transceiver station, and wherein half rate and full rate communications are also accomplished on the radio interface.

6. The method of claim 1, wherein the switch from full rate to half rate on the fixed Abis interface allows for additional correction and control bits on the radio interface.

7. The method of claim 1, further comprising a step of modifying calls when the estimated current load is above the certain threshold by link adapting the calls from a higher codec to a lower codec which reduces speech quality but makes room for a new call, an addition of a packet data channel, or a modification to a packet data channel.

8. A system in a telecommunication system communicating with a mobile station, comprising:

a base station controller;

a base transceiver station having a fixed Abis interface to said base station controller, a transcoder and rate adapter unit (TRAU) for coding communication signals according to one of a plurality of Adaptive Multi Rate (AMR) codecs defining half rate full rate communications on the fixed Abis interface between the base station controller and the base transceiver station, wherein the base transceiver station has half rate or full rate communications for the coded communication signals on a radio interface with the mobile station;

a load estimating means for estimating the current load on the fixed Abis interface;

if the estimated current load is above a certain threshold, a switching means for switching communications on the fixed Abis interface from the full rate to the half rate while keeping the full rate communications on the radio interface, wherein when the estimated current load is above the certain threshold this indicates that the Abis interface is currently overloaded and then the subsequent switching communications on the Abis interface from the full rate to the half rate results in the Abis interface being even more overloaded than before the switching of the communications but the overload is compensated for on the radio interface.

9. The system of claim 8, wherein the load estimating means communicates with the base station controller for the downlink and with the mobile station for the uplink communications.

10. The system of claim 8, further comprising means for modifying calls when the estimated current load is above the certain threshold by link adapting the calls from a higher codec to a lower codec which reduces speech quality but makes room for a new call, an addition of a packet data channel, or a modification to a packet data channel.

* * * * *

UNITED STATES PATENT AND TRADEMARK OFFICE
CERTIFICATE OF CORRECTION

| | | |
|---|---|---|
| PATENT NO. | : 7,848,742 B2 | Page 1 of 1 |
| APPLICATION NO. | : 11/571182 | |
| DATED | : December 7, 2010 | |
| INVENTOR(S) | : Bakhuizen | |

It is certified that error appears in the above-identified patent and that said Letters Patent is hereby corrected as shown below:

In Column 1, Line 67, delete "all additional" and insert -- an additional --, therefor.

In Column 2, Line 32, delete "THE DRAWINGS" and
insert -- BRIEF DESCRIPTION OF THE DRAWINGS --, therefor.

In Column 4, Line 12, delete "tile" and insert -- the --, therefor.

In Column 4, Line 26, delete "or" and insert -- of --, therefor.

In Column 6, Line 3, in Claim 8, delete "half rate" and insert -- half rate or --, therefor.

Signed and Sealed this
Twenty-third Day of August, 2011

David J. Kappos
*Director of the United States Patent and Trademark Office*